(12) United States Patent
Kurita

(10) Patent No.: US 7,257,824 B2
(45) Date of Patent: Aug. 14, 2007

(54) DISK PLAYER AND WORM MECHANISM FOR SAME

(75) Inventor: Takeshi Kurita, Osaka (JP)

(73) Assignee: Funai Electric Co., Ltd. (JP)

( * ) Notice: Subject to any disclaimer, the term of this patent is extended or adjusted under 35 U.S.C. 154(b) by 442 days.

(21) Appl. No.: 10/898,340

(22) Filed: Jul. 26, 2004

(65) Prior Publication Data
US 2005/0028176 A1     Feb. 3, 2005

(30) Foreign Application Priority Data
Jul. 28, 2003     (JP) ............................. 2003-202288

(51) Int. Cl.
G11B 17/04     (2006.01)
(52) U.S. Cl. .................................. 720/607
(58) Field of Classification Search ................ 720/607; 369/30.98, 30.94, 30.99
See application file for complete search history.

(56) References Cited

U.S. PATENT DOCUMENTS

| | | | |
|---|---|---|---|
| 5,780,751 A * | 7/1998 | Nomerange et al. ... | 73/862.325 |
| 6,053,061 A * | 4/2000 | Furukawa et al. ......... | 74/89.14 |
| 6,590,849 B1 * | 7/2003 | Yamauchi et al. .......... | 720/607 |
| 6,912,927 B2 * | 7/2005 | Eberle ......................... | 74/425 |

FOREIGN PATENT DOCUMENTS

| | | |
|---|---|---|
| JP | 60-142342 U | 9/1985 |
| JP | 63-53944 U | 4/1988 |
| JP | 63-59255 U | 4/1988 |
| JP | 03-204424 A | 9/1991 |
| JP | 3040490 U | 6/1997 |
| JP | 2002-147576 A | 5/2002 |
| JP | 2003-054431 | 2/2003 |

* cited by examiner

Primary Examiner—Julie Anne Watko
(74) Attorney, Agent, or Firm—Bacon & Thomas, PLLC

(57) ABSTRACT

A worm mechanism for a disk player includes a worm gear securely connected to a rotary shaft of a motor, a worm wheel coupled to the worm gear and further connected to driving mechanisms in the disk player and a radial stopper, wherein the worm gear including a boss part securely connected to said rotary shaft, a screw shaft part and a connection part coaxially formed between the boss part and screw shaft part in a unified structure, wherein the radial stopper is disposed on the other side of the worm wheel, apart from the screw shaft part in a predetermined gap in the vicinity of the end of the screw shaft part opposite to the boss part and wherein the connection part has in at least part thereof in the axial direction an effective cross section which is smaller than the cross section of the screw shaft part.

12 Claims, 8 Drawing Sheets

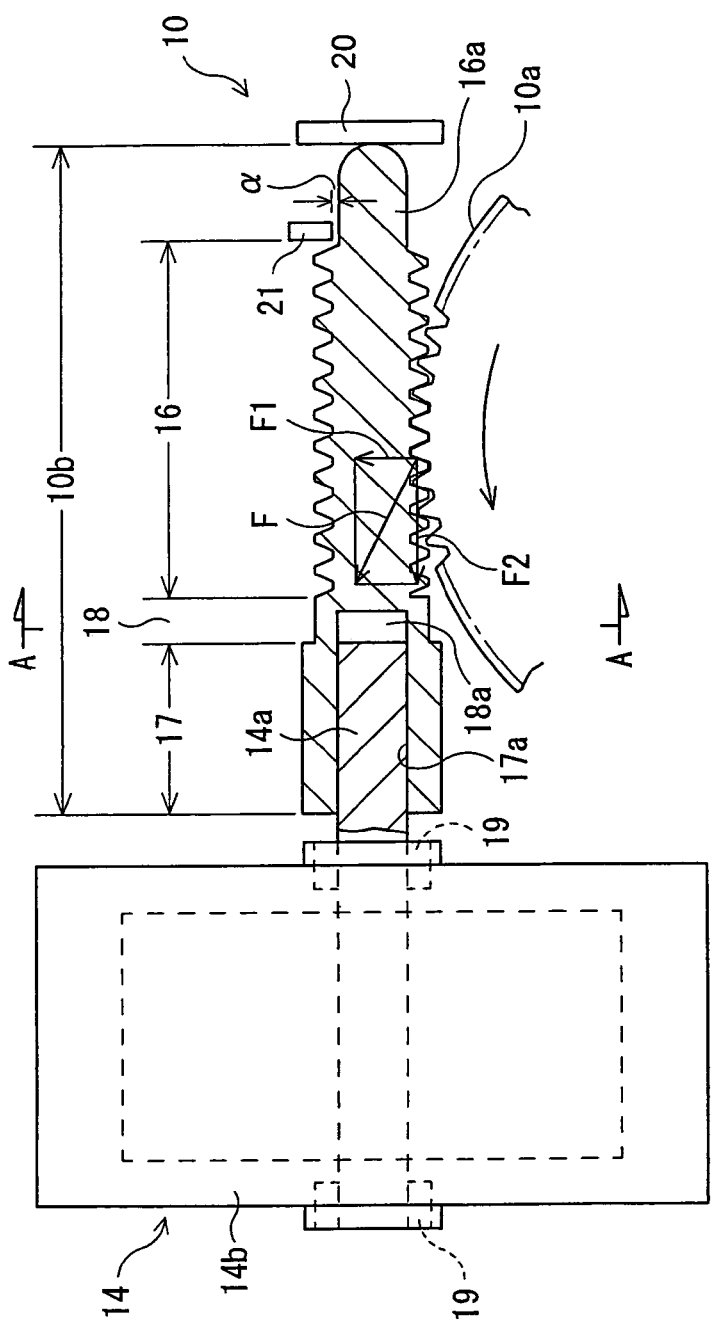
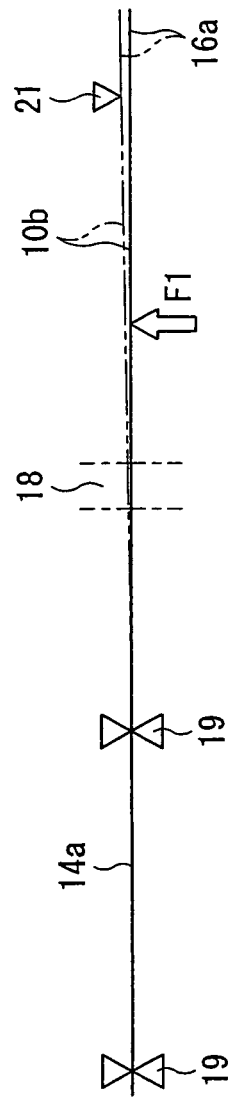
FIG.1A
FIG.1B

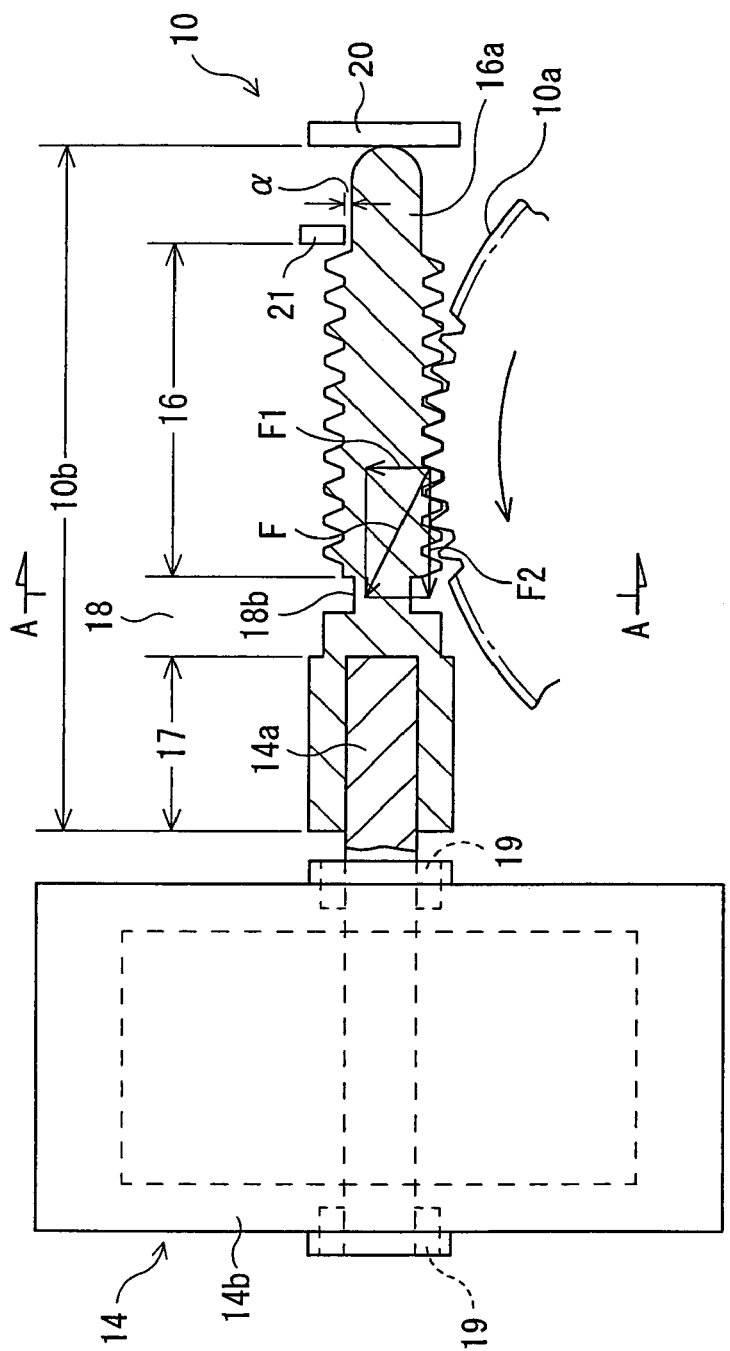
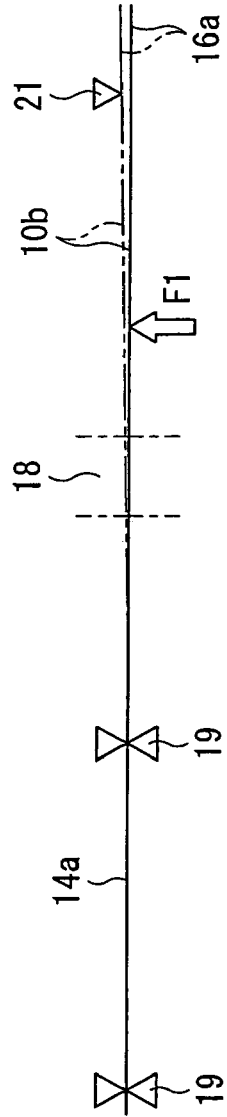
FIG. 3A
FIG. 3B

DISK PLAYER AND WORM MECHANISM FOR SAME

BACKGROUND OF THE INVENTION

1. Field of the Invention

The present invention relates to a disk player, which is used for reproducing, recording or eliminating data on an optical disk, such as DVD-RW, or a magnetic disk (hereinafter referred to as a disk), and it also relates to a worm mechanism for such a disk player. More specifically, the present invention relates to an improvement of a disk player and a worm mechanism for the same, where such a disk is loaded into the disk player by applying a pushing force to a tray for the disk.

2. Description of the Related Art

Such a disk player is equipped with a loading mechanism, which permits loading a disk thereinto in order to reproduce data from the disk or to record data in the disk as well as to discharge the loaded disk therefrom. The loading mechanism includes three different driving mechanisms; a first driving mechanism is used to move a tray on which the disk is placed in the forward or backward direction (discharge direction and load direction) relative to a housing; a second driving mechanism serves to incline in the upward or downward direction a drive chassis onto which a turn table for rotating the loaded disk and an optical pick-up for reading the information in the disk; and a third driving mechanism is used to move the optical pick-up on the drive chassis in the forward or backward direction. In the first driving mechanism, there is a tray detecting unit for determining whether or not the tray resides at the farthest advanced position (the initial position at which the disk is mounted onto the tray), and the detection signal from the tray detecting unit is used to detect the end of the discharge process, and then used to determine the subsequent start of the loading process. By utilizing the second driving mechanism, the drive chassis may be moved from a lower inclined attitude to the horizontal attitude in synchronization with the translational movement of the tray, when the tray is moved from the discharge position onto the turn table at the normal loading position. Furthermore, the third driving mechanism is used to move the optical pick-up to a predetermined read/write position on the drive chassis, after it confirms that the disk is mounted at the normal loading position.

At present, there are two types of disk player prevailingly used. The first type of disk player includes two rotary driving sources (motors). In this case, the first rotary driving source is used to actuate the first, second and third driving mechanisms, whereas the second rotary driving source is connected to a spindle for the turn table, and it is used to rotate the disk. On the other hand, the second type of disk player includes three rotary driving sources. In this case, the first rotary driving source is used to actuate the first driving mechanism, and the second rotary driving source is used to actuate both the second and third driving mechanisms, and the third rotary driving mechanism is connected to a spindle for the turn table, and it is used to rotate the disk, as similarly to the first type of disk player.

In both types of disk player, the rotary movement from the first rotary driving source is transmitted to the first driving mechanism via a worm mechanism having a worm gear and a worm wheel, and finally to a pinion in the first driving mechanism. A rack for the pinion is fixed to the tray, and the rotary movement of the pinion from the first driving source is transformed to a translational movement, so that the tray is moved in the forward or backward direction, as described for a worm mechanism in the first type of disk player in Japanese Unexamined Patent Application Publication No. 2000-54431.

Either in the first type of disk player or in the second type of disk player, a disk is placed on the tray at the farthest advanced position, i.e., the disk-mounting position, and then the first driving mechanism allows the tray to automatically move in the loading position, i.e., the disk-operating position, when the tray is pushed toward the inside of the disk player by one or more fingers of a user. In such a conventional disk player, users sometimes encountered a trouble that the tray was not moved any longer to the loading position, even when the tray was pushed by their finger. The trouble results from the following reasons: The force of pushing the tray arrives at the worm gear in the worm mechanism via the first driving mechanism, and further it is transmitted to the rotary shaft of a motor (the first rotary driving source), which shaft is connected to the worm gear. In this case, the pushing force provides a partial force perpendicular to the axis of the rotary shaft at the worm gear, and such a partial vertical force is applied to bearings in the motor. This causes the motor to stop (that is, self-lock of the motor), and thereby a further movement of the tray to be suppressed.

SUMMARY OF THE INVENTION

Accordingly, it is a first object of the present invention to provide a worm mechanism for a disk player, which worm mechanism ensures the translational movement of a tray for loading the disk without any self-lock of the motor, when the tray is pushed by a finger of a user.

Furthermore, it is a second object of the present invention to provide a disk player, which ensures the translational movement of a tray for loading the disk without any self-lock of the motor, when the tray is pushed by a finger of a user.

In accordance with a first aspect of the invention, the first object is attained by a worm mechanism for a disk player, which is used to transmit a rotary movement generated in a rotary driving source to at least one driving mechanism, the worm mechanism comprising: a worm gear securely connected to a rotary shaft of the rotary driving source; a worm wheel coupled to the worm gear and further connected to the at least one driving mechanism; and a radial stopper, wherein the worm gear comprising: a boss part securely connected to the rotary shaft; a screw shaft part; and a connection part coaxially formed between the boss part and screw part in a unified structure, wherein the radial stopper is disposed on the other side of the worm wheel, apart from the screw shaft part in a predetermined gap in the vicinity of the end of the screw shaft part opposite to the boss part, and wherein the connection part has in at least part thereof in the axial direction an effective cross section which is smaller than the cross section of the screw shaft part.

The structural arrangement of the worm mechanism in the first aspect of the invention provides a reduced effective cross section for the connection part of the worm gear, so that the partial force in the direction perpendicular to the axis of the worm gear resulting from the push of the tray causes the worm gear to be elastically deformed such that it is bent at the connection part. As a result, the partial force having the vertical component can be transmitted to the rotary shaft for the motor in a greatly reduced magnitude, thereby enabling the self-lock of the motor to be securely suppressed.

In the first aspect of the invention, moreover, the worm mechanism is more advantageously realized by the structural arrangement in which the connection part has a coaxial hollow cylindrical hole.

In the first aspect of the invention, moreover, the worm mechanism is more advantageously realized by the structural arrangement in which the connection part has an annular groove on the outer surface.

In the first aspect of the invention, moreover, the worm mechanism is more advantageously realized, when the worm gear is made of a plastic material.

In accordance with a second aspect of the invention, the second object of the invention is attained by a disk player comprising: a housing; a tray on which a disk is placed; a drive chassis for carrying a turn table connected to a motor to rotate said disk and an optical pick-up for reading the information in the disk; a first driving mechanism for moving the tray in the forward or backward direction; a second driving mechanism for inclining the drive chassis in the upper or lower direction around a pivot axis in synchronization with the movement in the first driving mechanism; a third driving mechanism for moving the optical pick-up on the drive chassis in the forward or backward direction; a rotary driving source; and a worm mechanism for transmitting the rotary movement resulting from the rotary driving source to the first and third driving mechanisms, wherein the worm mechanism comprising: a worm gear securely connected to a rotary shaft of the rotary driving source; a worm wheel coupled to the worm gear and further connected to the first and third driving mechanisms; and a radial stopper, wherein the worm gear comprising: a boss part securely connected to the rotary shaft; a screw shaft part; and a connection part coaxially formed between the boss part and screw part in a unified structure, wherein the radial stopper is disposed on the other side of the worm wheel, apart from the screw shaft part in a predetermined gap in the vicinity of the end of the screw shaft part opposite to the boss part, and wherein said connection part has in at least part thereof in the axial direction an effective cross section which is smaller than the cross section of the screw shaft part.

The structural arrangement of the disk player in the second aspect of the invention provides a reduced effective cross section for the connection part of the worm gear, so that the partial force in the direction perpendicular to the axis of the worm gear resulting from the push of the tray causes the worm gear to be elastically deformed such that it is bent at the connection part. As a result, the partial force having the vertical component can be transmitted to the rotary shaft for the motor in a greatly reduced magnitude, thereby enabling the self-lock of the motor to be securely suppressed. This ensures a smooth and continuous translational movement of the tray, when the tray is pushed by a finger to load the disk.

In the second aspect of the invention, moreover, the disk player is more advantageously realized by the structural arrangement in which the connection part has a coaxial hollow cylindrical hole.

In the second aspect of the invention, moreover, the disk player is more advantageously realized by the structural arrangement in which the connection part has an annular groove on the outer surface.

In the second aspect of the invention, moreover, the disk player is more advantageously realized, when the worm gear is made of a plastic material.

In accordance with a third aspect of the invention, the second object of the invention is attained by a disk player comprising: a housing; a tray on which a disk is placed; a drive chassis for carrying a turn table connected to a motor to rotate the disk and an optical pick-up for reading the information in the disk; a first driving mechanism for moving the tray in the forward or backward direction; a second driving mechanism for inclining the drive chassis in the upper or lower direction around a pivot axis in synchronization with the movement in the first driving mechanism; a third driving mechanism for moving the optical pick-up on the drive chassis in the forward or backward direction; a first rotary driving source; a second rotary driving source for activating the third driving mechanism; and a worm mechanism for transmitting the rotary movement resulting from the first rotary driving source to the first driving mechanisms, wherein the worm mechanism comprising: a worm gear securely connected to a rotary shaft of the rotary driving source; a worm wheel coupled to said worm gear and further connected to the first driving mechanisms; and a radial stopper, wherein the worm gear comprising: a boss part securely connected to the rotary shaft; a screw shaft part; and a connection part coaxially formed between the boss part and screw shaft part in a unified structure, wherein the radial stopper is disposed on the other side of the worm wheel, apart from the screw shaft part in a predetermined gap in the vicinity of the end of the screw shaft part opposite to the boss part and wherein the connection part has in at least part thereof in the axial direction an effective cross section which is smaller than the cross section of the screw shaft part.

The structural arrangement of the disk player in the third aspect of the invention provides a reduced effective cross section for the connection part of the worm gear, so that the partial force in the direction perpendicular to the axis of the worm gear resulting from the push of the tray causes the worm gear to be elastically deformed such that it is bent at the connection part. As a result, the partial force having the vertical component can be transmitted to the rotary shaft for the motor in a greatly reduced magnitude, thereby enabling the self-lock of the motor to be securely suppressed. This ensures a smooth and continuous translational movement of the tray, when the tray is pushed by a finger to load the disk.

In the third aspect of the invention, moreover, the disk player is more advantageously realized by the structural arrangement in which the connection part has a coaxial hollow cylindrical hole.

In the third aspect of the invention, moreover, the disk player is more advantageously realized by the structural arrangement in which the connection part has an annular groove on the outer surface.

In the third aspect of the invention, moreover, the disk player is more advantageously realized, when the worm gear is made of a plastic material.

Other objects, features and advantages of the present invention will become apparent from the following description of the preferred embodiments with reference to the accompanying drawings.

BRIEF DESCRIPTION OF THE DRAWINGS

FIG. 1A is a magnified sectional view of a worm mechanism in a first embodiment of the invention;

FIG. 1B is a diagram for elucidating the action of partial forces in the worm mechanism in FIG. 1A;

FIG. 3A is a magnified sectional view of a worm mechanism in a second embodiment of the invention;

FIG. 3B is a diagram for elucidating the action of partial forces in the worm mechanism in FIG. 3A;

DESCRIPTION OF THE PREFERRED EMBODIMENTS

Referring now to FIGS. 5-8, in which a conventional disk player is illustrated as a comparative example, the structural arrangement and function of the disk player will be described, before the present invention is detailed.

Figure 5:
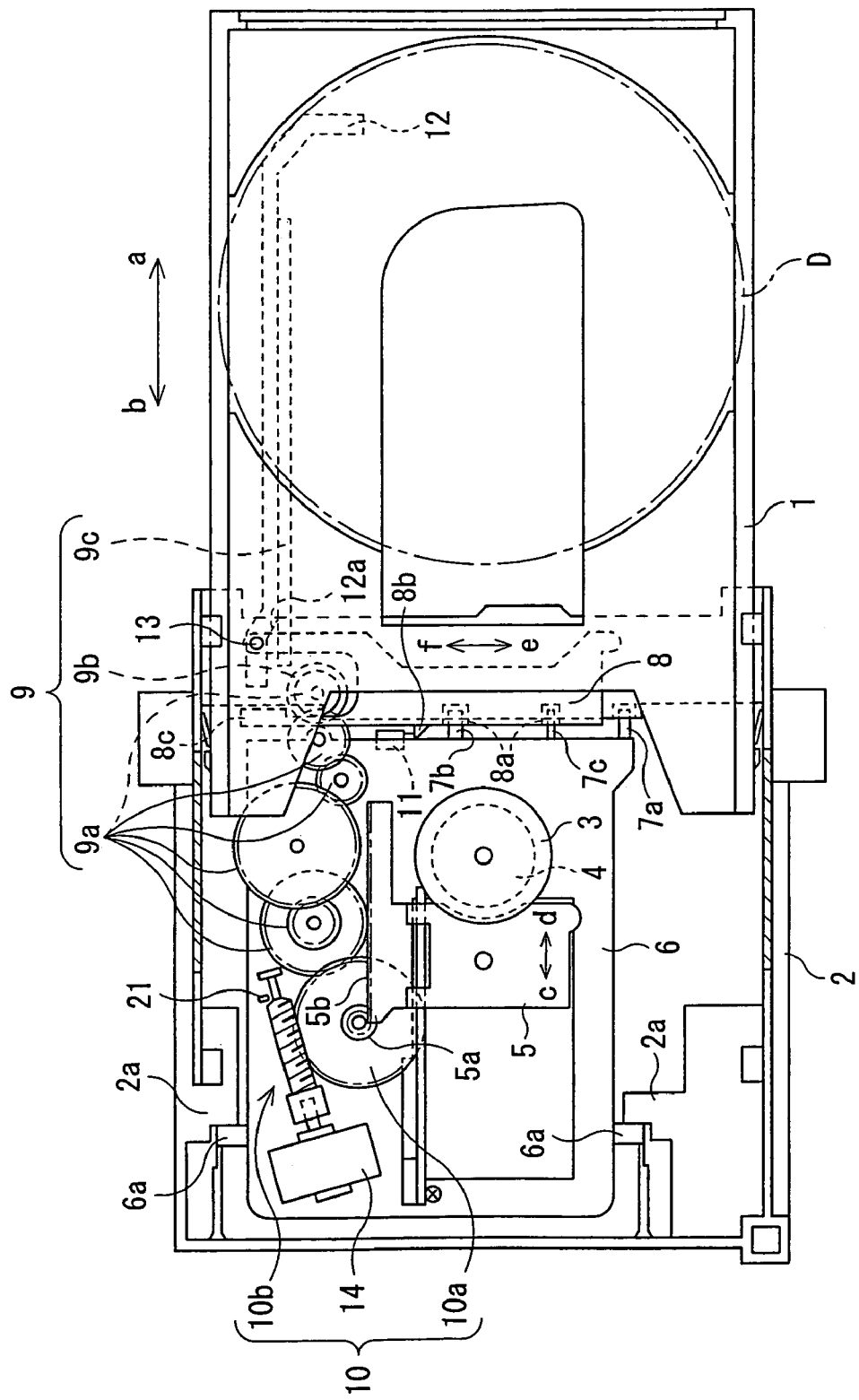
FIG. 5 is a plan view of a conventional disk player in the unloading state.

The disk player includes a plastic housing 2, which supports movably in the forward or backward direction (a, b) a tray 1 for mounting a disk D. The disk player further includes a drive chassis 6 on which a spindle motor 4 connected to a turntable 3 is placed and an optical pick-up 5 is placed movably in the direction of arrow (c, d), in which case, paired left and right pivots 6a at the end part of the drive chassis 6 are inserted into corresponding bearings 2a in the rear part of the housing 2. A pair of fixed camshafts 7a and 7b, and a movable camshaft 7c projected from the front end of the drive chassis 6 are respectively inserted into corresponding cam holes 8a of a cam plate 8, which is moved slidably in the left or right direction (e, f) perpendicular to the forward or backward direction (a, b) at the front part of the housing 2. As a result, the drive chassis 6 is mounted inside the housing 2 in such a way that it is inclined rotatably in the up and down direction (g, h) around the pivots 6a. In order to selectively move each of the tray 1, the drive chassis 6 and the optical pick-up 5, the disk player further includes a worm mechanism 10, which is capable of operating these elements 1, 6 and 5 via a gear mechanism 9. In FIG. 5, reference numeral 11 means a tray detector consisting of a micro-switch disposed in the front end of the drive chassis 6, and the tray detector 11 detects the farthest advanced state (a) of the tray 1 from the state which the micro-switch is pushed by a pushing piece 8b projected from the cam plate 8 (see FIG. 5). Reference numeral 12 means a substantially L-shaped groove formed on the back of the tray 1. In this case, a guide pin 13 projected from the cam plate 8 is inserted into the groove 12.

Figure 6:
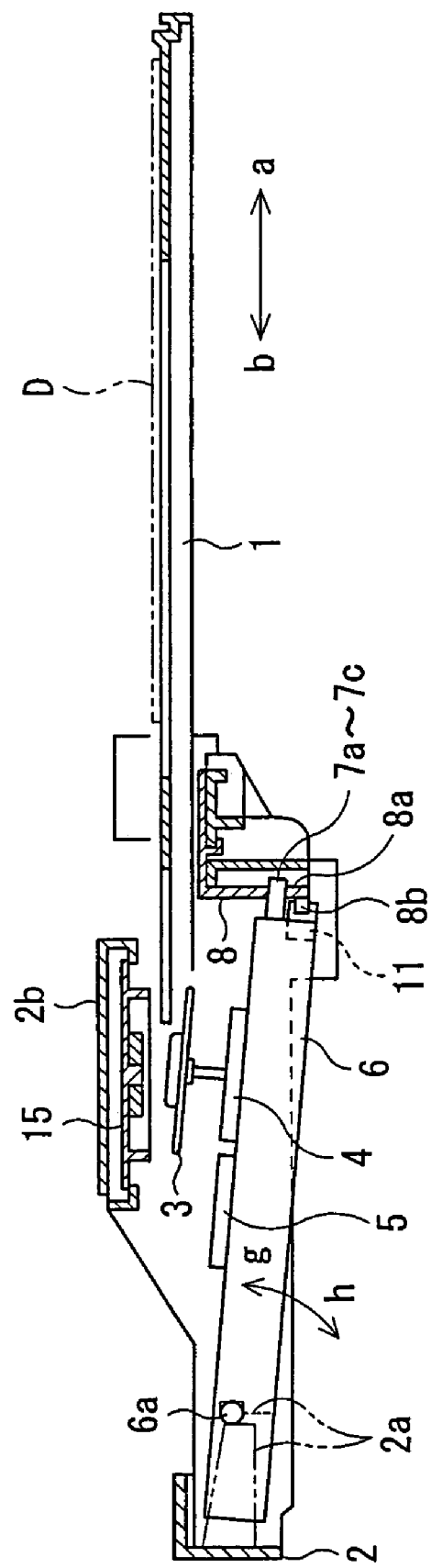
FIG. 6 is a longitudinal sectional view of the conventional disk player in the un-loading state.

As shown in FIG. 5, the gear mechanism 9 includes the gear train 9a consisting of a plurality of gears which are interconnected with each other. A rack 9c projected from the lower surface of the tray 1 is engaged with a pinion 9b coupled to the gear train 9a, thereby enabling the tray 1 to be moved in the forward or backward direction (a, b) (the first driving mechanism). The movable cam shaft 7c is connected to the gear train 9a and the slide movement of the movable cam shaft 7c in the left or right direction (e, f) causes the cam plate 8 to moved in the same direction (e, f), thereby enabling the drive chassis 6 to be moved in the upper or lower direction (g, h) via the cam shafts 7a-7c (the second driving mechanism). The connection of the optical pick-up 5 with the gear train 9a via the pinion 5a and rack 5b allows the optical pick-up 5 to be moved in the direction of arrow (c, d) (the third driving mechanism). In FIG. 6, reference numeral 15 means a disk holder onto which a magnet is mounted, and the disk holder 15 can be moved up and down inside a central storage section formed in a ceiling plate 2b, which is disposed above the housing 2.

Figures 7A, 7B:
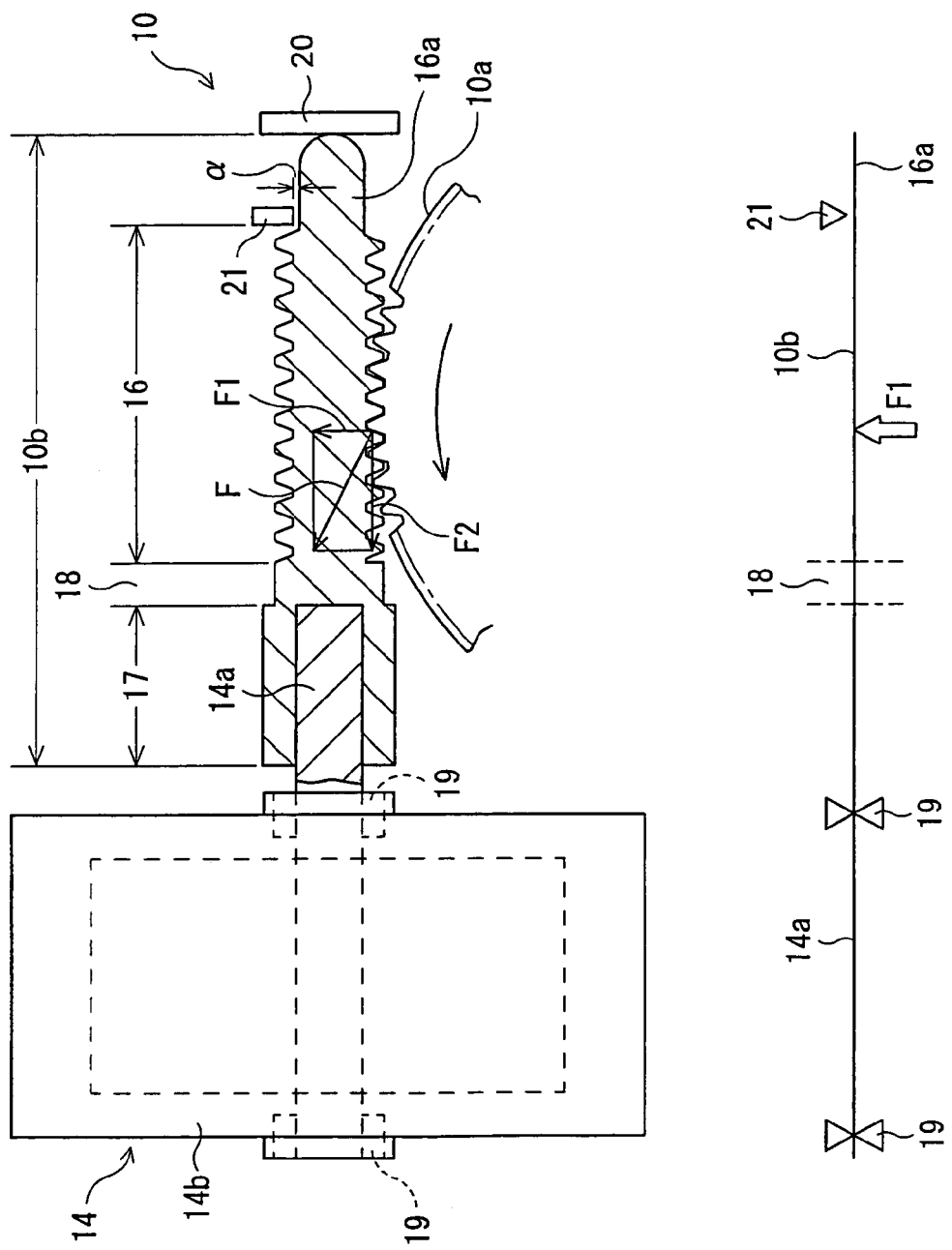
FIG. 7A is a magnified sectional view of a conventional worm mechanism.
FIG. 7B is a diagram for elucidating the action of partial forces in the conventional worm mechanism in FIG. 7A.

As shown in FIG. 7A, the worm mechanism 10 is constituted by a plastic worm wheel 10a for selectively moving the tray 1, drive chassis 6 and optical pick-up 5 via the gear mechanism 9, and by a plastic worm gear 10b which can be reversibly rotated by a feed motor 14. In this case, the worm gear 10b comprises a screw shaft part 16 engaged with the worm wheel 10a, a boss part 17 engaged with a driving shaft 14a of the feed motor 14, a connection part 18 for coaxially connecting the boss part 17 with the screw shaft part 16 in a unified form, and a front projection part 16a coaxially connected to the front end surface of the screw shaft part 16. A radial stopper 21 is disposed on the drive chassis 6 such that it faces one side of the front projection part 16a in a small gap α, where one side is opposite to the worm wheel 10a with respect to the front projection part 16a. The driving shaft 14a is rotatably supported by a pair of bearings 19 in the main body 14b of the motor 14. In FIG. 7A, reference numeral 20 means an elastic support piece for elastically supporting the front surface of the screw shaft part 16.

The conventional worm mechanism 10 is described in Japanese Unexamined Patent Application Publication No. 2003-54431. FIG. 7A shows an example of such a worm mechanism. From the drawing in FIG. 7a, it is clearly seen that the connection part 18 of the worm gear 10b has the same diameter as the screw shaft part 16, and therefore the effective cross section of the connection part 18 is larger than that of the screw shaft part 16, because the screw shaft part 16 has a screw groove 16a on the outer surface.

Figure 8A:
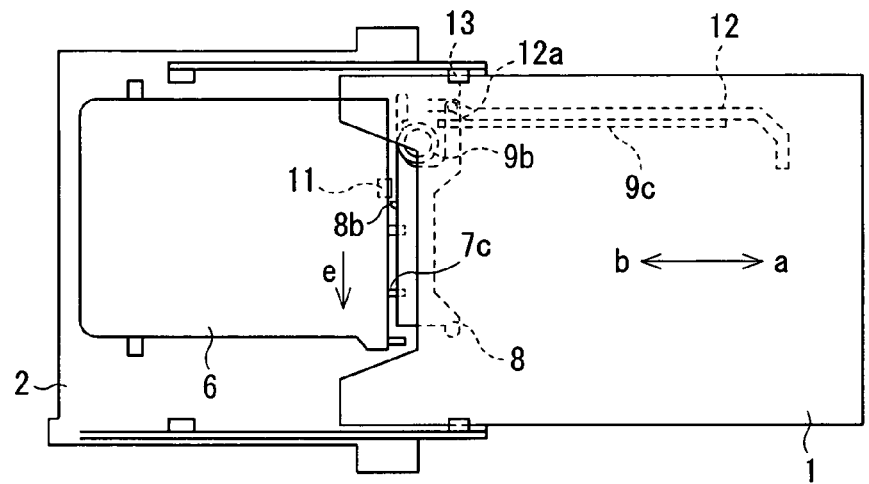
FIG. 8A is a schematic plan view of a conventional disk player in the un-loading state.
Figure 8B:
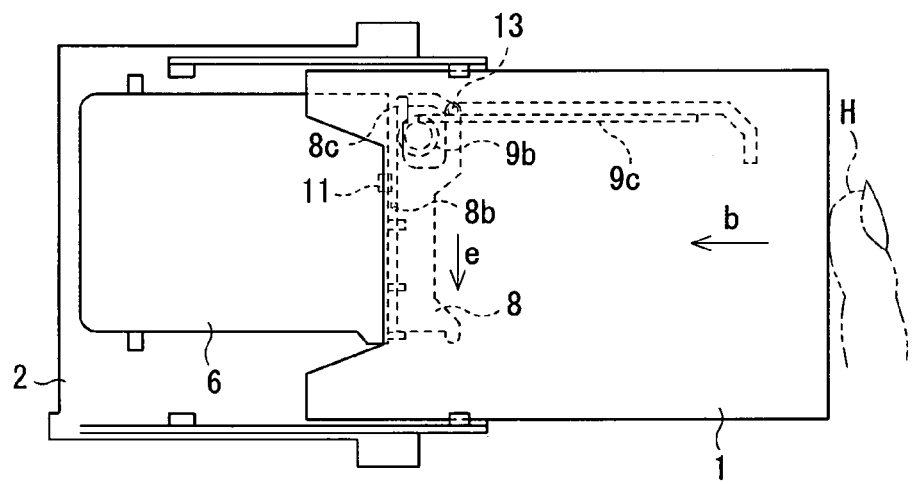
FIG. 8B is a schematic plan view of the conventional disk player just after starting from the un-loading state to the loading state.

In the following, the process of loading the disk in the invention will be described. FIG. 8A shows the state in which the tray 1 is located at the farthest advanced position a, and the tray detector 11 is pressed by the pushing piece 8b. By energizing the feed motor 14 in response to a loading signal, the movable cam shaft 7c can be moved slidably in the left direction (e) from the state with the aid of both the worm mechanism 10 and the gear mechanism 9, thereby enabling the cam plate 8 to be moved in the same direction (e). Accordingly, as shown in FIG. 8B, the guide pin 13 projected from the cam plate 8 presses the inclined surface 12a of the guide groove 12 to slightly move the tray 1 in the backward direction (b), thereby allowing the rack 9c to be engaged with the pinion 9b. In conjunction with this process, the tray detector 11 departs from the pushing piece 8b at the almost same time, and is then turned off. When the tray detector 11 detects the OFF state, the feed motor 14 energized in accordance with the OFF signal starts to rotate the pinion 9b, thereby enabling the tray 1 to be moved in the backward direction (b) (see FIG. 8C). The process of unloading is carried out, substantially reversing the above process, and therefore the description thereof is omitted.

Figure 8C:
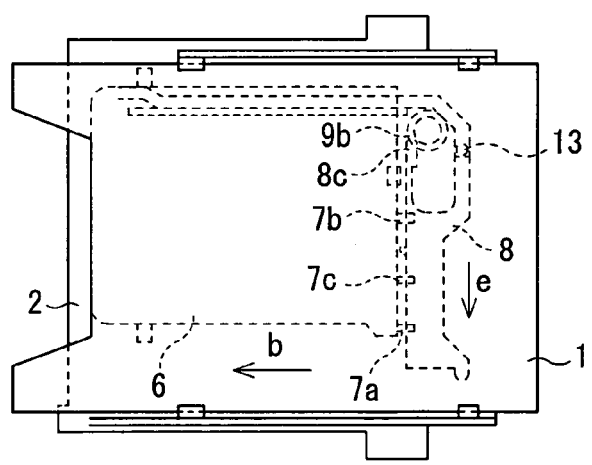
FIG. 8C is a schematic plan view of the conventional disk player in the loading state.

As shown by virtual lines in FIG. 8B, even when the tray 1 in the farthest advanced state (a) is pushed by finger H into the inside of the disk player, the feed motor 14 energized in accordance with the OFF signal of the tray detector 11 rotates the pinion 9b, and therefore the tray 1 can be moved in the backward direction (b) (see FIG. 8C).

In the following, the worm mechanism and disk player according to the present invention will be described, along with the above-described comparative example.

Figure 2:
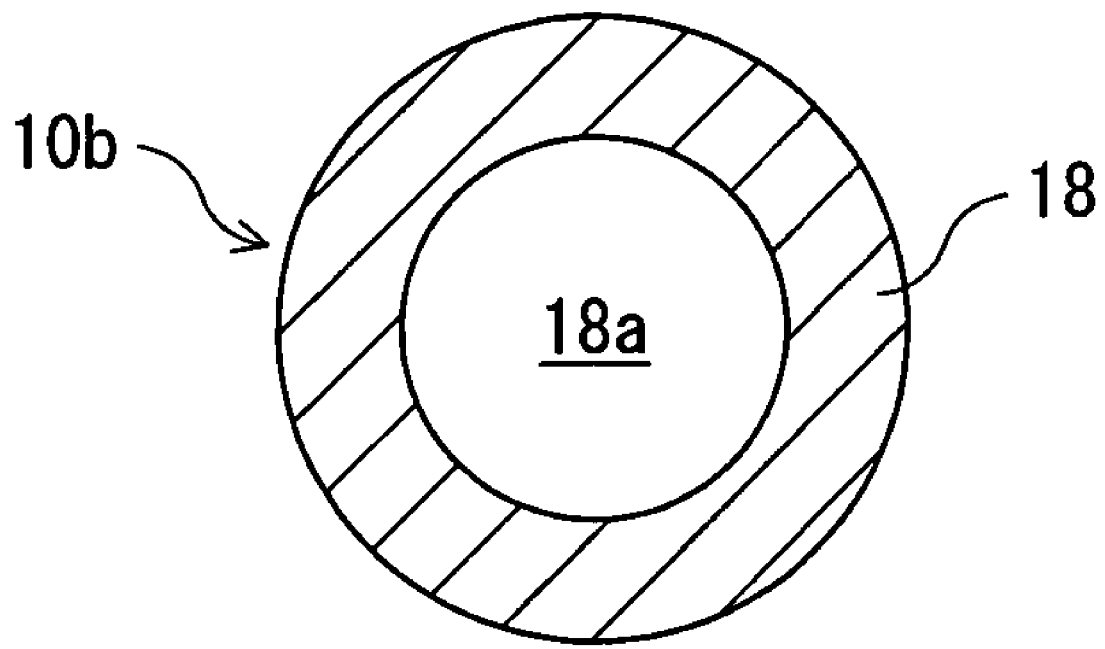
FIG. 2 is an enlarged sectional view of the worm mechanism viewed from line A-A in FIG. 1A.

FIGS. 1A, 1B and 2 illustrate the structural arrangement of a substantial section in a disk player of a first embodiment according to the invention. A connection part 18 of a worm gear 10b is formed such that it has the same diameter as a screw shaft part 16. In this case, a boss part 17 is formed such that it has a coaxial hollow cylindrical hole 18a having the same diameter as that of a hole 17a into which a driving shaft 14a of a feed motor 14 is inserted (referred to as a driving shaft-inserting hole). Accordingly, the effective cross section of the connecting part 18 is smaller than that of the screw shaft part 16. The arrangement of structural elements other than the above-mentioned ones is substantially the same as that shown in FIGS. 5-8, so that similar symbols are allocated to corresponding parts and the description of the function thereof will be omitted.

In the above arrangement, when the tray 1 in the farthest advanced state (a) is pushed by finger H, a pushing force F is applied to the screw shaft part 16 of the worm gear 10b via the worm wheel 10a. The pushing force F can be decomposed into a lateral tooth surface partial force F1 and longitudinal tooth surface partial force F2, as shown in FIG. 1B. The lateral tooth surface partial force F1 causes the connecting part 18 to be bent, so that the worm gear 10b is deflected thereat and a front projection part 16a comes into contact with a radial stopper 21 (see the virtual line in FIG. 1B). As a result, the tooth surface partial force F1 is distributed onto both the radial stopper 21 and the paired bearings 19 of the feed motor 14. This causes to decrease the excessive reaction force generated in each of the bearings 19. Hence, the so-called self-lock of rotation in the conventional feed motor 14, which results from the increased reaction force at both bearings 19 can successfully be suppressed, thereby enabling the tray 1 to be moved smoothly in the backward direction (b).

Moreover, it is noted that the worm gear 10b having the connection part 18, in which the coaxial hollow cylindrical hole 18a is formed, can steadily be formed inside only by further extending the driving shaft-inserting hole 17a of the boss part 17 toward the connection part 18.

Here, it is of particular importance that the present invention abandons the traditional concept that an unbendable structure has to be employed for the worm gear 10b, and from the viewpoint of a new technical concept, the present invention employs a simple structure for the same to securely suppress the self-lock of the feed motor 14.

Figure 4:
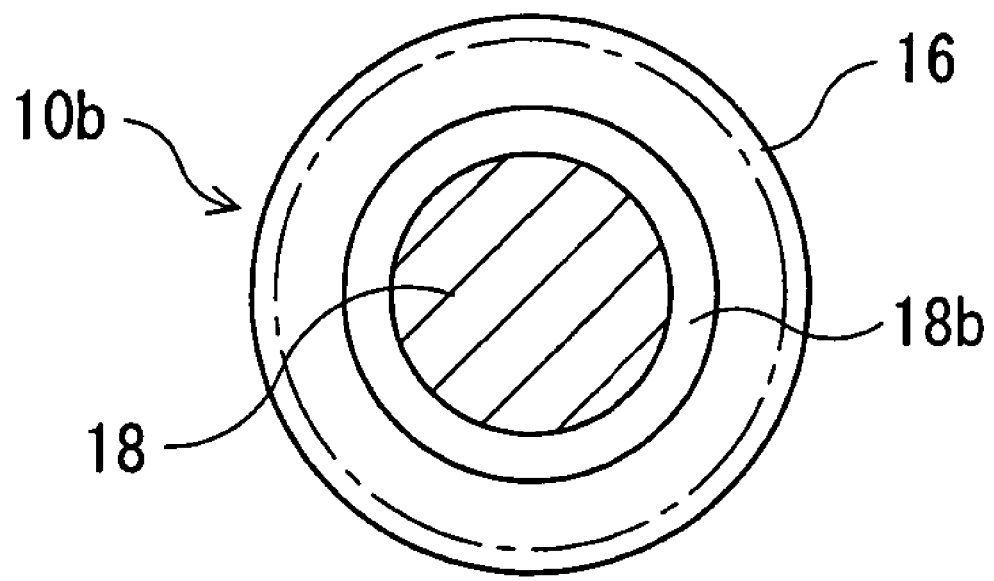
FIG. 4 is an enlarged sectional view of the worm mechanism viewed from line A-A in FIG. 3A.

FIGS. 3A, 3B and 4 illustrate the structural arrangement of a substantial section in a disk player of a second embodiment according to the invention. In this case, an annular groove 18b is formed on the outer surface of a connection part 18 in a worm gear 10b, and the effective cross section of the connection part 18 is determined to be smaller than that of a screw shaft part 16. The arrangement of structural elements other than the above-mentioned ones is substantially the same as that shown in FIGS. 1A, 1B and 2, so that similar symbols are allocated to corresponding parts and the description of the function thereof will be omitted.

In this structural arrangement of the second embodiment, a similar effect to that in the disk player of the first embodiment can be obtained. It is noted that the worm gear 10b having a smaller effective cross section than that of the screw shaft part 16 can easily be realized only by forming such an annular groove 18b on the outer surface of the connection part 18.

In the first and second embodiments, the present invention is described as for the disk player. However, the present invention is not restricted to the above, but it can also be applied to a worm mechanism for driving a movable element in various electric appliances.

In accordance with the first embodiment of the invention, as shown in FIGS. 1A, 1B and 2, the worm gear having a connection part is employed, in which case, the effective cross section of the connection part is determined to be smaller than that of the screw shaft part by forming a hollow cylindrical hole in the connection part. As a result, when a pushing force is applied to the screw shaft part of the worm gear via the worm wheel by pushing the tray in the farthest advanced state with a finger of a user, the worm gear is elastically deformed such that it is bent at the connection part, so that the front end part comes into contact with the radial stopper. Accordingly, the pushing force is applied to both the radial stopper and the bearings of the feed motor in a distributed manner, thereby enabling the reaction force to be decreased at the positions of the bearings. It can be stated, therefore, that the so-called self-lock of the feed motor resulting from the excess reaction force at the bearings as in the related art can be securely suppressed and the tray can be smoothly moved.

In the first embodiment, the worm gear having a connection part, in which a hollow cylindrical hole is formed, can steadily be formed only by extending the driving shaft-inserting hole of the boss part toward the connection part.

Here, it is of particular importance that the present invention abandons the traditional concept that an unbendable structure has to be employed for the worm gear, and from the viewpoint of a new technical concept, the present invention employs a simple structure for the same to securely suppress the self-lock of the feed motor.

In accordance with the second embodiment of the invention, as shown in FIGS. 3A, 3B and 4, a similar effect to that in the first embodiment can be obtained. The worm gear having a connection part whose effective cross section is smaller than that of the screw shaft part can easily be realized only by forming an annular groove on the outer surface of the connection part.

Here, it is of particular importance that the present invention abandons the traditional concept that an unbendable structure has to be employed for the worm gear, and from the viewpoint of a new technical concept, the present invention employs a simple structure for the same to securely suppress the self-lock of the feed motor.

While preferred embodiments have been shown and described, various modifications and substitutions may be made without departing from the spirit and scope of the invention. Accordingly, it is to be understood that the present invention has been described by way of example, and not by limitation.

What is claimed is:

1. A worm mechanism for a disk player, which is used to transmit a rotary movement generated in a rotary driving source to at least one driving mechanism, said worm mechanism comprising:

a worm gear securely connected to a rotary shaft of said rotary driving source;

a worm wheel coupled to said worm gear and further connected to said at least one driving mechanism; and a radial stopper, wherein said worm gear comprises: a boss securely connected to said rotary shaft; a screw shaft; and a connection portion coaxially formed between and integral with said boss and said screw shaft, wherein said radial stopper is disposed adjacent an end of said screw shaft opposite said boss, on the side of said screw shaft opposite said worm wheel, and spaced from said screw shaft with a predetermined gap therebetween, and wherein said connection portion has an annular groove in its outer surface, said annular groove forming an axial section having an effective cross section which is smaller than the cross section of said screw shaft.

2. A worm mechanism according to claim 1, wherein said worm gear is made of a plastic material.

3. A disk player comprising: a housing; a tray on which a disk is placed; a drive chassis for carrying a turn table connected to a motor to rotate said disk and an optical pick-up for reading the information in said disk; a first driving mechanism for moving said tray in the forward or backward direction; a second driving mechanism for inclining said drive chassis in the upper or lower direction around a pivot axis in synchronization with the movement in said first driving mechanism; a third driving mechanism for moving said optical pick-up on the drive chassis in the forward or backward direction; a rotary driving source; and a worm mechanism for transmitting the rotary movement resulting from said rotary driving source to said first and third driving mechanisms, wherein said worm mechanism comprises: a worm gear securely connected to a rotary shaft of said rotary driving source; a worm wheel coupled to said worm gear and further connected to said first and third driving mechanisms; and a radial stopper, wherein said worm gear comprises: a boss securely connected to said rotary shaft; a screw shaft; and a connection portion coaxially formed between and integral with said boss and said screw shaft, wherein said radial stopper is disposed adjacent an end of said screw shaft opposite said boss, on the side of said screw shaft opposite said worm wheel, and spaced from said screw shaft with a predetermined gap therebetween, and wherein said connection portion has, in at least an axial section thereof, an effective cross section which is smaller than the cross section of said screw shaft part.

4. A disk player according to claim 3, wherein said connection portion has a coaxial hollow cylindrical hole.

5. A disk player according to claim 4, wherein said worm gear is made of a plastic material.

6. A disk player according to claim 3, wherein said connection portion has an annular groove on its outer surface.

7. A disk player according to claim 6, wherein said worm gear is made of a plastic material.

8. A disk player comprising: a housing; a tray on which a disk is placed; a drive chassis for carrying a turn table connected to a motor to rotate said disk and an optical pick-up for reading the information in said disk; a first driving mechanism for moving said tray in the forward or backward direction; a second driving mechanism for inclining said drive chassis in the upper or lower direction around a pivot axis in synchronization with the movement in said first driving mechanism; a third driving mechanism for moving said optical pick-up on the drive chassis in the forward or backward direction; a first rotary driving source; a second rotary driving source for activating said third driving mechanism; and a worm mechanism for transmitting the rotary movement resulting from said first rotary driving source to said first driving mechanisms, wherein said worm mechanism comprises: a worm gear securely connected to a rotary shaft of said rotary driving source; a worm wheel coupled to said worm gear and further connected to said first and third driving mechanisms; and a radial stopper, wherein said worm gear comprises: a boss securely connected to said rotary shaft; a screw shaft; and a connection portion coaxially formed between and integral with said boss and said screw shaft, wherein said radial stopper is disposed adjacent an end of said screw shaft opposite said boss, on the side of said screw shaft opposite said worm wheel, and spaced from said screw shaft with a predetermined gap therebetween, and wherein said connection portion has, in at least an axial section thereof, an effective cross section which is smaller than the cross section of said screw shaft part.

9. A disk player according to claim 8, wherein said connection portion has a coaxial hollow cylindrical hole.

10. A disk player according to claim 9, wherein said worm gear is made of a plastic material.

11. A disk player according to claim 8, wherein said connection portion has an annular groove on its outer surface.

12. A disk player according to claim 11, wherein said worm gear is made of a plastic material.

* * * * *